US011721096B2

(12) United States Patent
Lauer et al.

(10) Patent No.: US 11,721,096 B2
(45) Date of Patent: Aug. 8, 2023

(54) METHOD, APPARATUS, AND SYSTEM FOR CONFIRMING ROAD VECTOR GEOMETRY BASED ON AERIAL IMAGES

(71) Applicant: HERE Global B.V., Eindhoven (NL)

(72) Inventors: Johannes Lauer, Berlin (DE); Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 98 days.

(21) Appl. No.: 17/483,422

(22) Filed: Sep. 23, 2021

(65) Prior Publication Data

US 2023/0086235 A1   Mar. 23, 2023

(51) Int. Cl.
| | |
|---|---|
| *G06V 20/10* | (2022.01) |
| *G01C 11/04* | (2006.01) |
| *G06V 10/30* | (2022.01) |
| *G06V 10/42* | (2022.01) |
| *G06V 10/44* | (2022.01) |
| *G06V 10/56* | (2022.01) |
| *G06V 10/75* | (2022.01) |
| *G06V 30/422* | (2022.01) |

(52) U.S. Cl.
CPC ............ *G06V 20/182* (2022.01); *G01C 11/04* (2013.01); *G06V 10/30* (2022.01); *G06V 10/42* (2022.01); *G06V 10/44* (2022.01); *G06V 10/56* (2022.01); *G06V 10/751* (2022.01); *G06V 30/422* (2022.01)

(58) Field of Classification Search
CPC ...... G06V 20/182; G06V 10/30; G06V 10/42; G06V 10/44; G06V 10/56; G06V 10/751; G06V 30/422; G01C 11/04
See application file for complete search history.

(56) References Cited

U.S. PATENT DOCUMENTS

| | | |
|---|---|---|
| 7,660,441 B2 | 2/2010 | Chen et al. |
| 8,731,305 B1 | 5/2014 | Mantri |

(Continued)

FOREIGN PATENT DOCUMENTS

| | | | |
|---|---|---|---|
| JP | 2004294361 A | * 10/2004 | ........... G06K 9/0063 |
| JP | 2007033931 A | 2/2007 | |
| JP | 5724110 B2 | 5/2015 | |

OTHER PUBLICATIONS

Heipke et al., "Evaluation of Automatic Road Extraction", Article, In: International Archives of Photogrammetry and Remote Sensing, Oct. 1997, 10 pages.

(Continued)

*Primary Examiner* — Carol Wang
(74) *Attorney, Agent, or Firm* — Ditthavong, Steiner & Mlotkowski

(57) ABSTRACT

An approach is provided for confirming road vector geometry based on aerial image(s). For example, the approach involves retrieving a feature and a vector representation of a road link. The approach also involves processing one or more aerial images depicting the road link to extract a list of spectral pixel values corresponding to the vector representation. The approach further involves determining a degree of misalignment between the spectral pixel values and a spectral signature of the feature of the road link. The approach further involves initiating a confirmation of a geometry of the vector representation based on the degree of misalignment. The approach further involves providing the confirmation as an output.

20 Claims, 16 Drawing Sheets

(56) References Cited

U.S. PATENT DOCUMENTS

| | | | |
|---|---|---|---|
| 8,805,118 B2 | 8/2014 | Wu | |
| 9,395,193 B2 | 7/2016 | Carbonneau et al. | |
| 2017/0286782 A1* | 10/2017 | Pillai | G01C 21/3691 |
| 2018/0321142 A1* | 11/2018 | Seifert | B60W 50/14 |
| 2021/0150206 A1* | 5/2021 | Bader | G06T 7/20 |
| 2022/0414376 A1* | 12/2022 | Boroughs | G06V 20/182 |

OTHER PUBLICATIONS

Office Action for related European Patent Application No. 22197008.0-1009, dated Feb. 24, 2023, 6 pages.

Yu et al., "A Novel Two-steps Strategy for Automatic GIS-Image Registration", 2004 International Conference on Image Processing, 2004., pp. 1711-1714.

Macedo et al., "Remote Sensing Applied to the Extraction of Road Geometric Features Based on Optimum Path Forest Classifiers, Northeastern Brazil", Journal of Geographic Information System, 2020, pp. 15-44.

Das et al., "Use of Salient Features for the Design of a Multistage Framework to Extract Roads From High-Resolution Multispectral Satellite Images", Geoscience and Remote Sensing, IEEE Transactions vol. 49. No. 10, Oct. 2011, pp. 3906-3931.

\* cited by examiner

300

METHOD, APPARATUS, AND SYSTEM FOR CONFIRMING ROAD VECTOR GEOMETRY BASED ON AERIAL IMAGES

BACKGROUND

Location-based service providers (e.g., mapping and navigation providers) are continually challenged to provide compelling services and applications. One area of development relates to providing map data at a granularity to support advanced applications such as autonomous driving. Such advanced applications generally require highly accurate maps (e.g., digital maps) and vehicles equipped with sophisticated location-based sensors (e.g., global positioning system (GPS) sensors, Light Detection and Ranging (LiDAR) sensors, etc.) so that navigation systems can generate lane-level routing. However, road geometry data is susceptible to various errors due to inaccuracies in positioning devices, sensor errors, obstructions, unforeseen situations where relevant algorithms underperform, etc. As such, road links may erroneously appear over houses, grass lands, etc., which can lead to inaccurate routing or guidance and/or user delay. In addition, road data or the like can be freshly updated as more and more satellite images are becoming available with higher frequency and more details. Accordingly, mapping service providers face significant technical challenges to automatically verify road geometry with confidence and low latency.

Some Example Embodiments

Therefore, there is a need for an approach for confirming road vector geometry automatically and accurately.

According to one embodiment, a computer-implemented method comprises retrieving a feature and a vector representation of a road link. The method also comprises processing one or more aerial images depicting the road link to extract a list of spectral pixel values corresponding to the vector representation. The method further comprises determining a degree of misalignment between the spectral pixel values and a spectral signature of the feature of the road link. The method further comprises initiating a confirmation of a geometry of the vector representation based on the degree of misalignment. The method further comprises providing the confirmation as an output.

According to another embodiment, an apparatus comprises at least one processor, and at least one memory including computer program code for one or more programs, the at least one memory and the computer program code configured to, with the at least one processor, to cause, at least in part, the apparatus to retrieve a feature and a vector representation of a road link. The apparatus is also caused to process one or more aerial images depicting the road link to extract a list of spectral pixel values corresponding to the vector representation. The apparatus is further caused to determine a degree of misalignment between the spectral pixel values and a spectral signature of the feature of the road link. The apparatus is further caused to initiate a confirmation of a geometry of the vector representation based on the degree of misalignment. The apparatus is further caused to provide the confirmation as an output.

According to another embodiment, a computer-readable storage medium carrying one or more sequences of one or more instructions which, when executed by one or more processors, cause, at least in part, an apparatus to retrieve a feature and a vector representation of a road link. The apparatus is also caused to process one or more aerial images depicting the road link to extract a list of spectral pixel values corresponding to the vector representation. The apparatus is further caused to determine a degree of misalignment between the spectral pixel values and a spectral signature of the feature of the road link. The apparatus is further caused to initiate a confirmation of a geometry of the vector representation based on the degree of misalignment. The apparatus is further caused to provide the confirmation as an output.

According to another embodiment, an apparatus comprises means for retrieving a feature and a vector representation of a road link. The apparatus also comprises means for processing one or more aerial images depicting the road link to extract a list of spectral pixel values corresponding to the vector representation. The apparatus further comprises means for determining a degree of misalignment between the spectral pixel values and a spectral signature of the feature of the road link. The apparatus further comprises means for initiating a confirmation of a geometry of the vector representation based on the degree of misalignment. The apparatus further comprises means for providing the confirmation as an output.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for confirming road vector geometry based on aerial image(s) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments described herein are discussed with respect to vehicular traffic on roads, it is contemplated the approaches of the various embodiments are also applicable to monitoring pedestrian traffic on roads and/or other type of pedestrian travel segments (e.g., sidewalks, paths, etc.).

Figure 1:
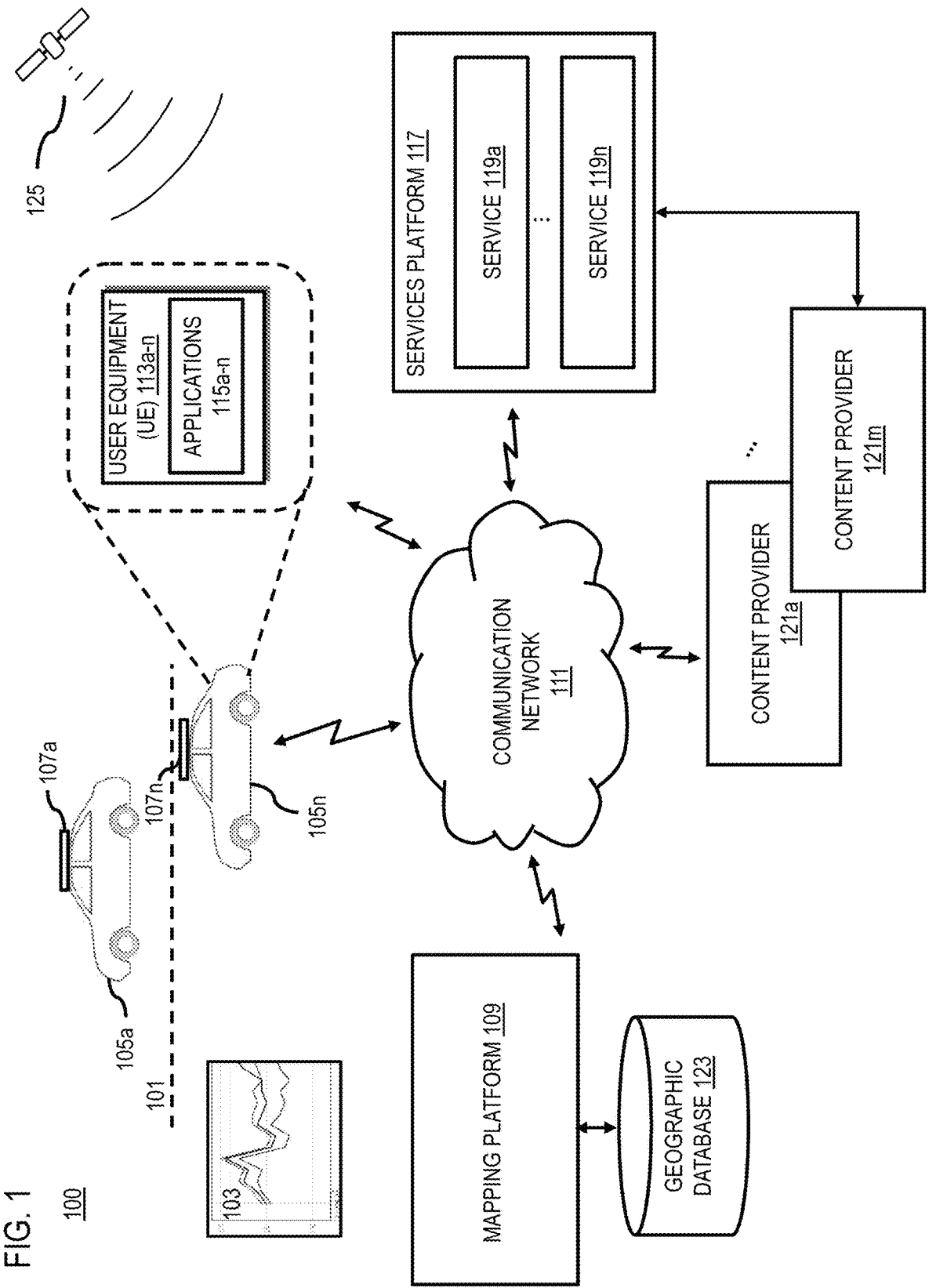
FIG. 1 is a diagram of a system capable of capable of confirming road vector geometry based on aerial image(s), according to one embodiment.

FIG. 1 is a diagram of a system capable of capable of confirming road vector geometry based on aerial image(s), according to one embodiment. Road vector data is typically determined from sensor data. However, the accuracy of the road vector data depends on the quality of the sensors which can be susceptible to various errors due to inaccuracies in positioning devices, sensor errors, obstructions, unforeseen situations where relevant algorithms underperform, etc. Some road vector data may be susceptible to human errors, such as crowd-sourced road data requiring cross-checking. As more and more satellite images are becoming available with higher frequency and more details, the map service providers can use the images to maintain road vector data up-to-date accuracy and quality. For achieving required freshness and quality, the map making processes need to scale through automation and deterministic algorithms so as to provide a distinct level of data quality and accurate representation of the real world. Thus, there is a need for a solution to automate the road geometry verification process.

To address the problem, a system 100 of FIG. 1 introduces the capability to confirm road vector geometry based on spectral pixel values 103 of a pre-existing vector representation of a road link 101 extracted from aerial image(s), according to one embodiment. In one embodiment, the system 100 can uses a line-drawing algorithm (e.g., Bresenham Algorithm) to get a list of pixels in the aerial image(s) based on the vector representation of the road link, as well as the associated spectral pixel values 103. The system 100 can then determine whether the list of the spectral pixel values 103 corresponding to the pre-existing vector representation of the road link aligns with a spectral signature of a feature (e.g., asphalt, tarmac, concrete, or other road surface materials) of the road link 100. When the vector representation of the road link is not aligned with the spectral signature, the system 100 can decrease a confidence value of the road link being represented. As such, the system 100 can automatedly confirmed/evaluated the road vector data as confident/reliable or not.

Figure 2:
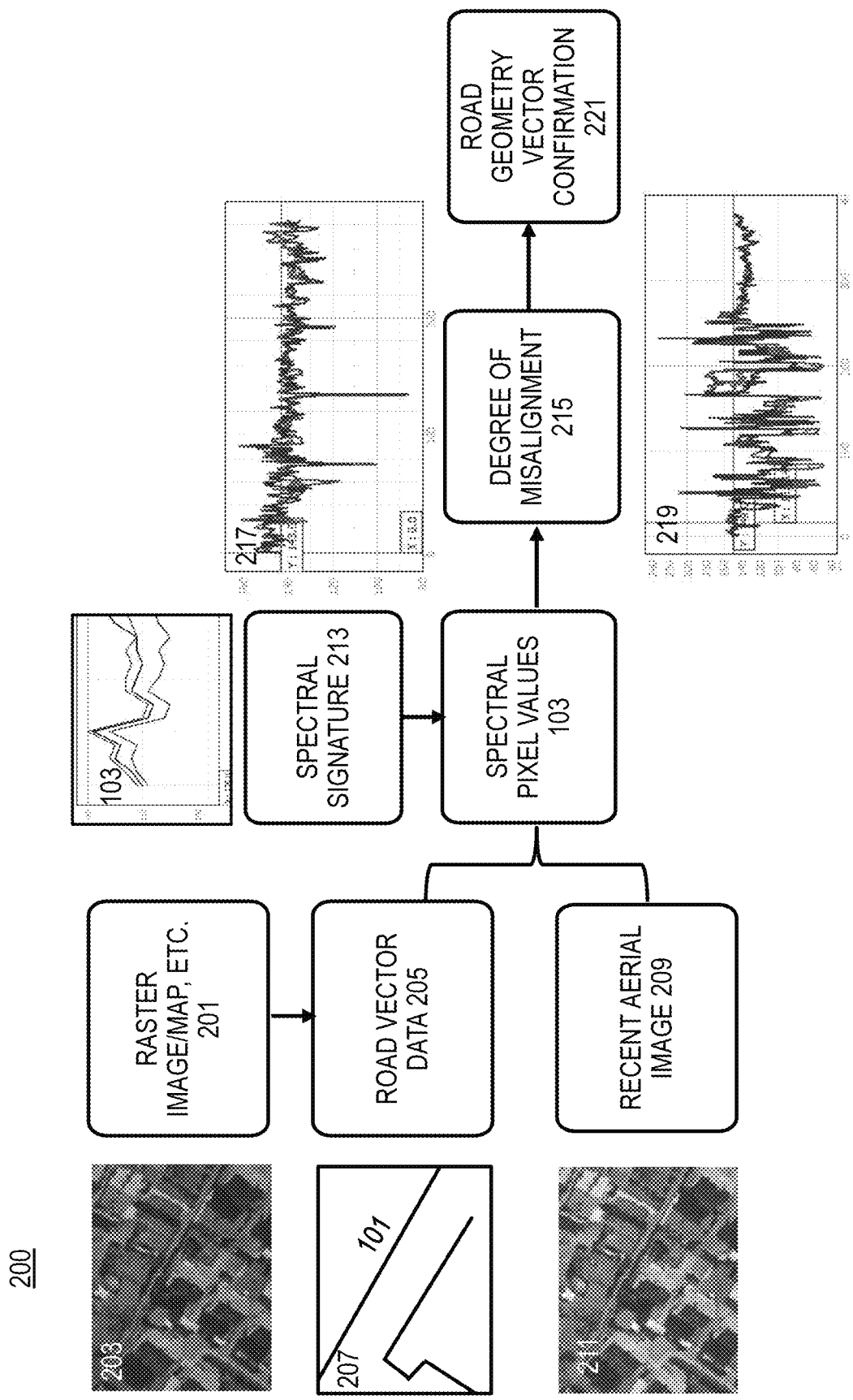
FIG. 2 is diagram of a process for automatically confirming road geometry based on spectral pixel values of a road link extracted from aerial image(s), according to one embodiment.

FIG. 2 is diagram of a process 200 for automatically confirming road geometry based on spectral pixel values of a road link extracted from aerial image(s), according to one embodiment. For instance, road vector data 205 can be extracted from raster image/map data, etc. 201. By way of example, a road link diagram 207 (depicting the road link 101 based on the road vector data 205) can be generated from a raster image 203. Common road extraction algorithms can be classification-based, knowledge-based, mathematical morphology, active contour model, and dynamic programming, etc.

Such raster image can be retrieved from a remote sensing image library. Remote sensing (e.g., from satellite or aircraft) can detect and monitor the physical characteristics of an area by measuring its reflected and emitted radiation at a distance. There are many types of remotely sensed data, such as aerial photography, satellite images, LiDAR, radar, unmanned aerial systems (UAS), thermal imagery, hyperspectral data, etc. The United States Geological Survey (USGS) Global Visualization Viewer (GloVis) is an popular online search and order tool for satellite and aerial data.

Raster images are pixel-based and contain color and tonal information of the image. Examples of raster image file types are: BMP, TIFF, GIF, PNG, and JPEG files. For instance, the raster image 203 depicts a main road, a small road, several houses and tree blocks, grass blocks, and other areas. In another embodiment, the road link diagram 207 can be extracted from a raster map, i.e., an electronic map image made up of a set number of pixels.

Vector data can display latitude and longitude using lines, splines, points, polygons, etc. to describe the topology. For instance, the road vector data 205 (e.g., of the road line 101) can be spatial data in a format consisting of points, lines, splines, and/or polygons. For instance, the road vector data 205 can comprise sequential points or vertices stored as coordinate pairs that indicate the road link 101. Each vertex contains x coordinate and a y coordinate. Beside roads, other map features such as administrative borders, linear features, rivers, etc. can be recorded as vector data.

Continuing with the process 200, the system 100 can retrieve a recent aerial image 209 (e.g., an image 211) depicting the road link 101 based on the road vector data 205 of the road link 101. The system 100 can use a line-drawing algorithm (e.g., Bresenham Algorithm) to get a list of pixels in the image 211 based on road vector data 205, and then retrieve the spectral pixel values 103 associated with the list of pixels. The system 100 can then determine a degree of misalignment 215 between the spectral pixel values 103 and a spectral signature 213 associated with a feature (e.g., asphalt, tarmac, concrete, or other road surface materials) of the roan link 101. For instance, a spectral profile diagram 217 shows an example of a high degree of alignment, i.e., a low degree of misalignment, thereby confirming that the road vector data 205 is validated as close to the road geometry in the real world (as later explained in conjunction with FIG. 3D). On the other hand, a spectral profile diagram 219 shows an example of a low degree of alignment, i.e., a high degree of misalignment, thereby confirming that the road vector data 205 is validated as deviating from the road geometry in the real world (as later explained in conjunction with FIG. 3E). Therefore, the system 100 can algorithmically confirm road vector geometry (e.g., expressed in the road vector data 205) with recent aerial image(s) 209, such as the aerial image 211. Not confirmed vector data, such as those have a deviation over a threshold distance (e.g., 5 meters), require further review/verification, e.g., by human, artificial intelligence, machine learning algorithms, etc.

Figure 3A:
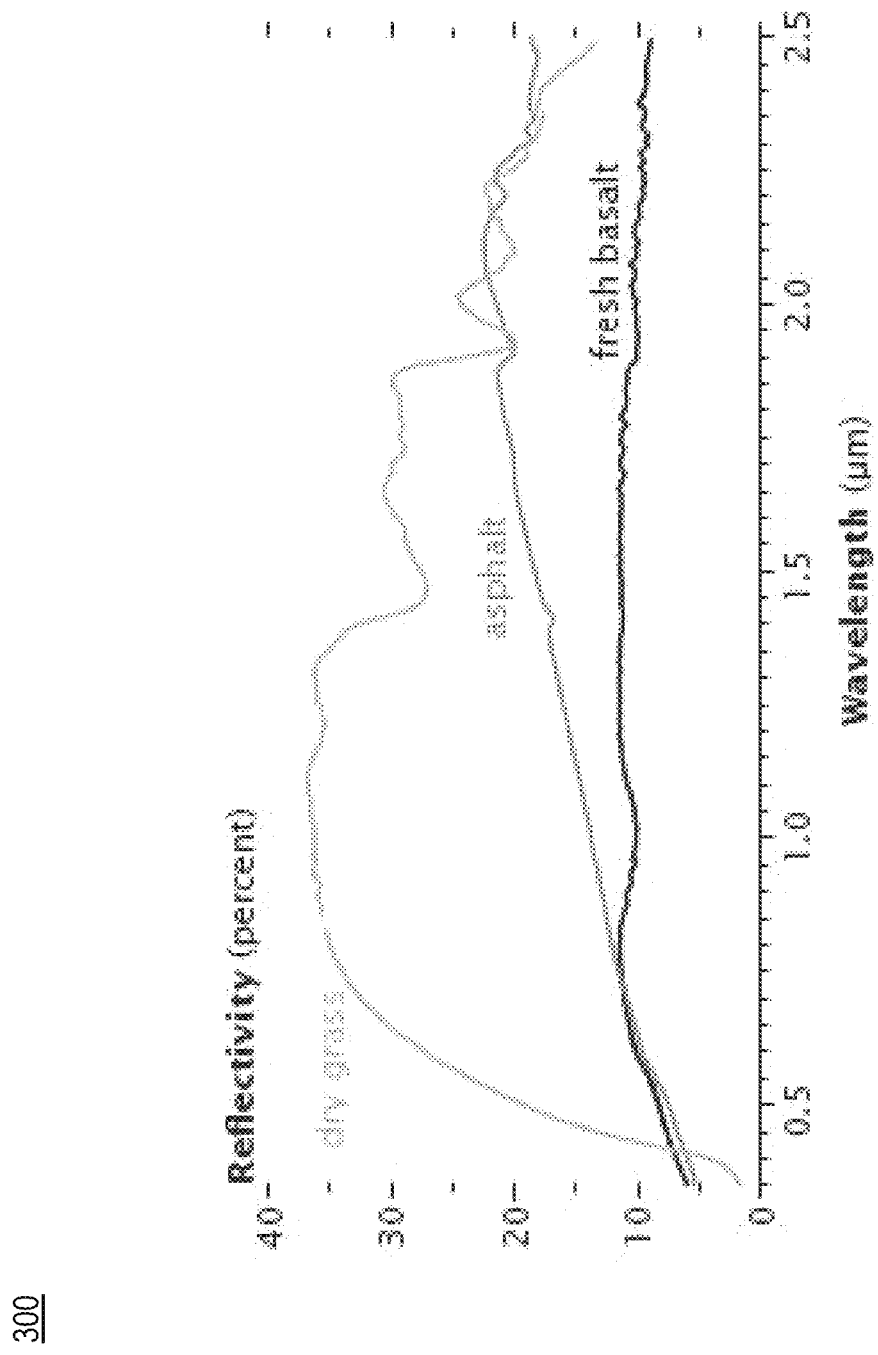
FIG. 3A is a diagram depicting spectral signatures of different materials, according to one embodiment.

Spectral signature is a variation of reflectance or emittance of a material with respect to wavelengths (i.e., reflectance/emittance as a function of wavelength). For instance, the USGS Spectral Characteristics Viewer compiles the spectral reflectance data of hundreds of materials each of which has its own chemical composition and spectral signature. For extracting road data from aerial images, the system 100 can take advantage of distinct spectral signatures of different road surface materials. FIG. 3A is a diagram 300 depicting spectral signatures of different materials, according to one embodiment. Dry grass is visually different from asphalt and fresh basalt, and its spectral signatures is quite different from the spectral signatures of asphalt and fresh basalt. Although asphalt and fresh basalt appear similar in visible light, they reflect different amounts of infrared light that constitute distinctive parts of their spectral signatures in FIG. 3A.

Figure 3B:
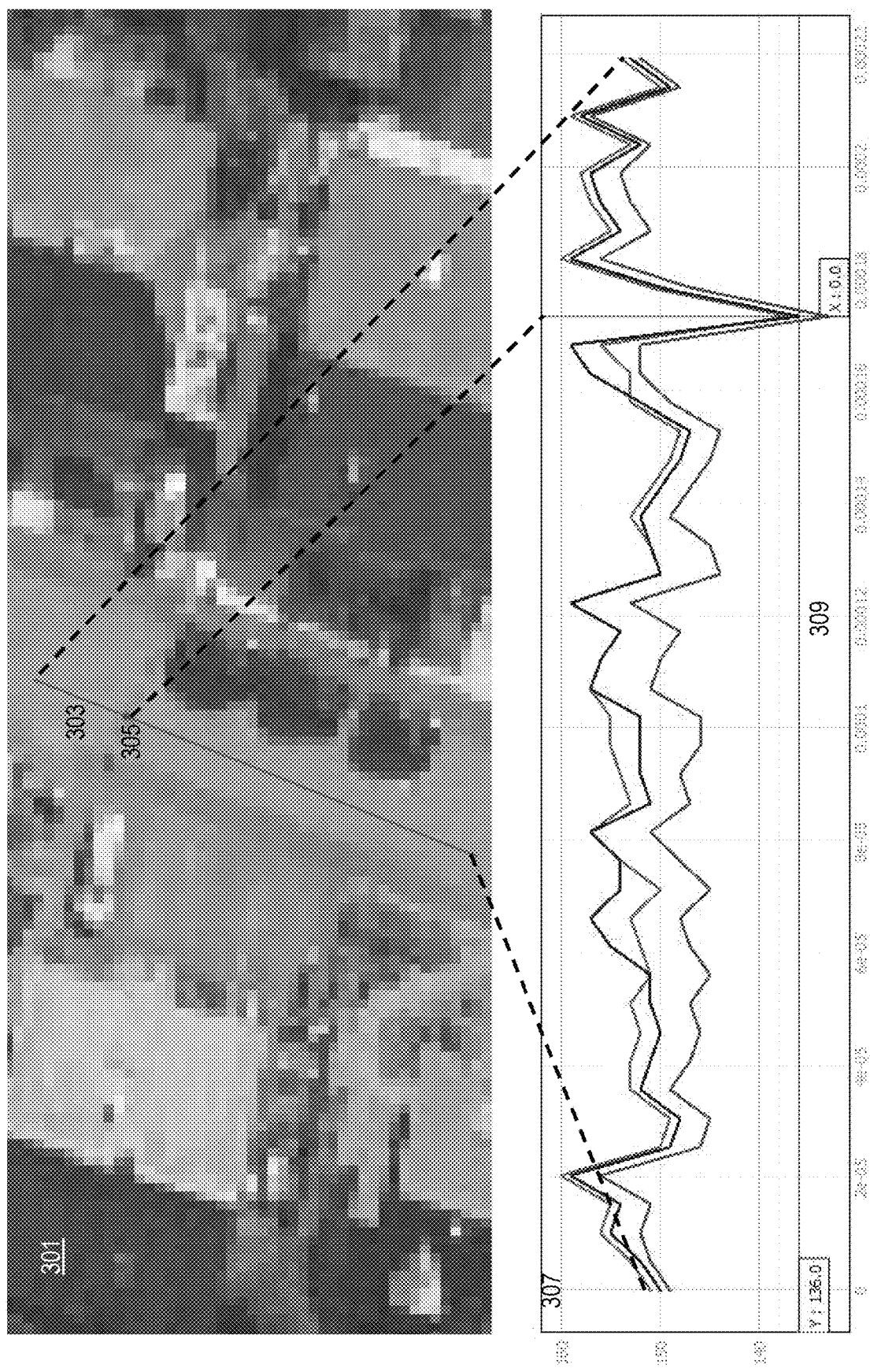
FIG. 3B are diagrams of spectral pixel values of a vector geometry, according to various embodiment.

In one embodiment, the system 100 can use natural-color (also called true-color) spectral pixel values in red, green, and blue channels in aerial images to confirm a road vector geometry. Concurrently or alternatively, the system 100 can use false-color spectral pixel values in wavelength channel(s) outside the visible range in arial images to confirm a road vector geometry. FIG. 3B are diagrams of spectral pixel values of a vector geometry, according to various embodiment. The top diagram of FIG. 3B is a raster image 301 marked with a vector representation 303 of the road link 101. Such vector representation 303 can be represented as a list of spectral pixel values in R, B, G channels/bands in a spectral profile diagram 307 which provide a fingerprint-like representation of the road link 101. As shown in the spectral profile diagram 307, the spectral values of a gray asphalt road surface of the road link 101 for each band are quite homogeneous (e.g., varying between 145 and 160 for each band), except a drop 309 (e.g., a darker value corresponding to a powerline) at a location 305 of the vector representation 303. The spectral feature signature of one material (e.g., asphalt) typically maintains a higher correlation value among the RGB bands/channels, which points to a higher confidence of alignment. The system 100 can set a pre-determined threshold value on that correlation and/or a confidence indicator value for confirming the road vector geometry or raising a flag for review.

Figure 3C:
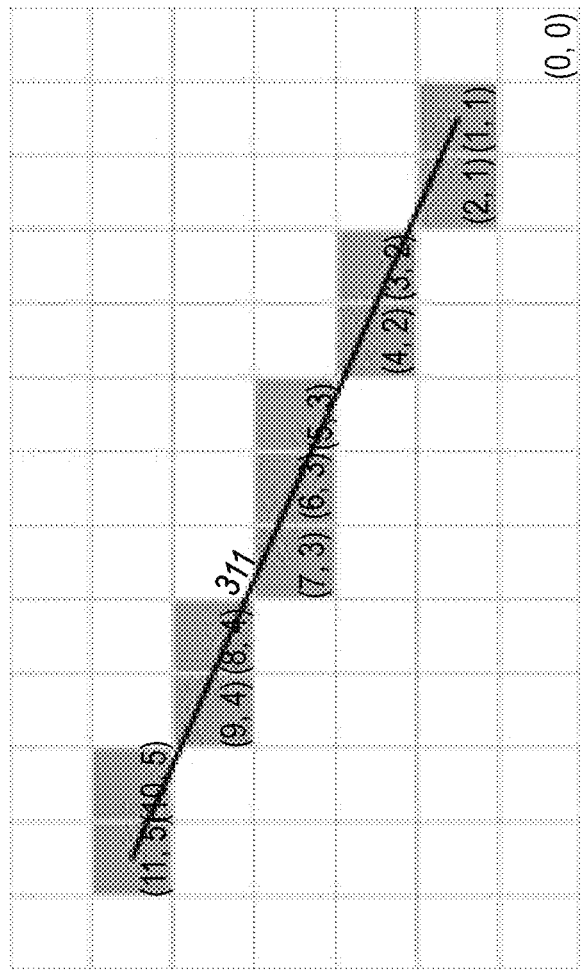
FIG. 3C is a diagram of an example grid, according to one embodiment.

Roads can be easier to identify on an aerial image for the human eye because of their homogeneous spectral pixel values. FIG. 3C is a diagram of an example grid, according to one embodiment. However, as shown in FIG. 3C, it is not as intuitive to draw a line in a raster image between two pixels of a grid 310: (1, 1) at the top left end of the line and (11, 5) at the bottom right end of a line 311. The system 100 can use a line drawing algorithm (e.g., Bresenham Algorithm) to get a list of pixel values for the line 311: (1, 1), (2, 1), (3, 2), (4, 2), (5, 3), (6, 3), (7, 3), (8, 4), (9, 4), (10, 5), (11, 5). Other line drawing algorithms include naive algorithm, Xiaolin Wu's line algorithm, Gupta-Sproull algorithm, etc. By analogy, the system 100 can use the line drawing algorithm to get a list of pixel values from the raster image 301 as the road vector representation 303 for the road link 101.

Figure 3D:
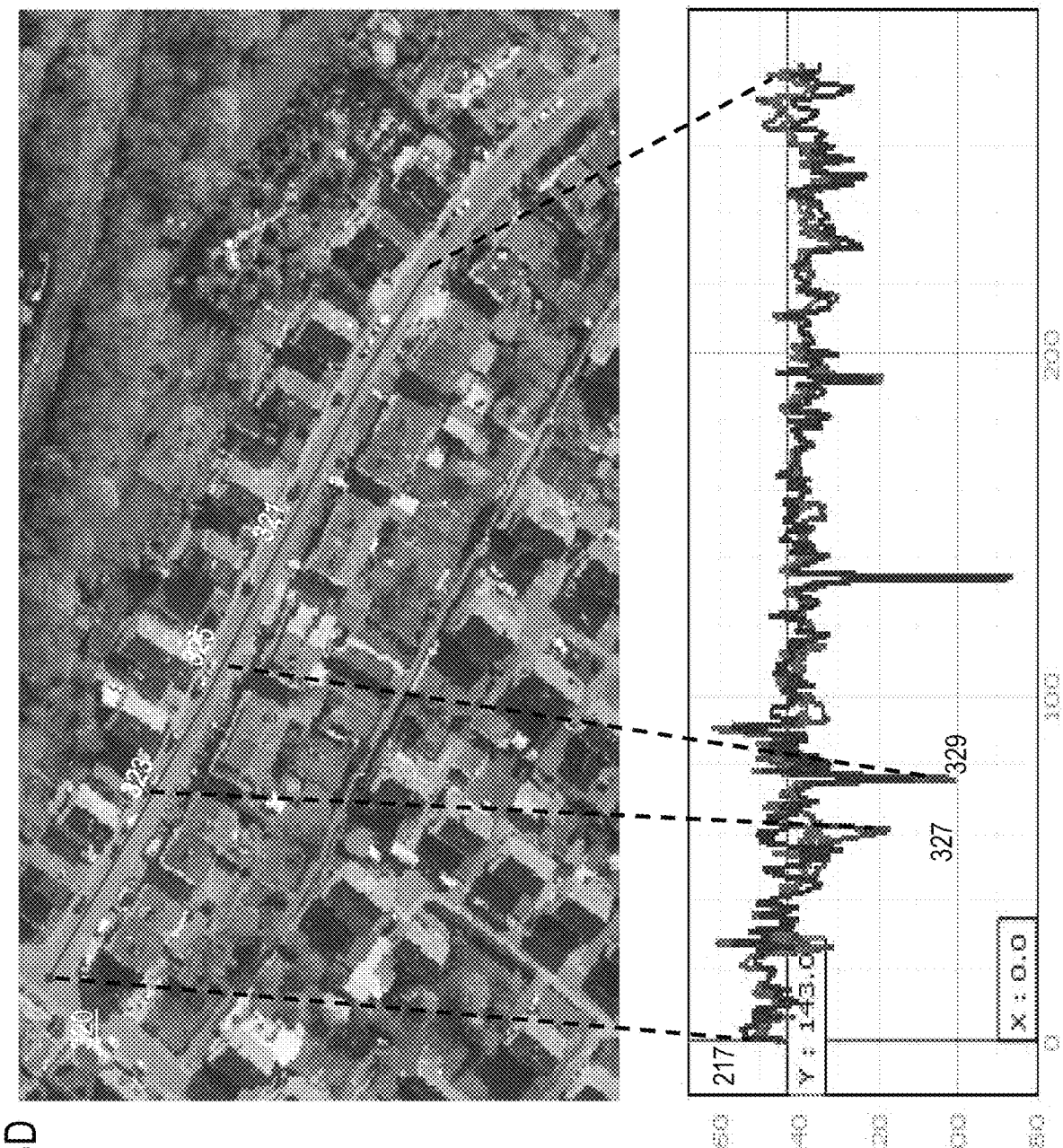
FIGS. 3D-3E are diagrams of spectral pixel values of two vector geometry examples, according to various embodiments.
Figure 3E:
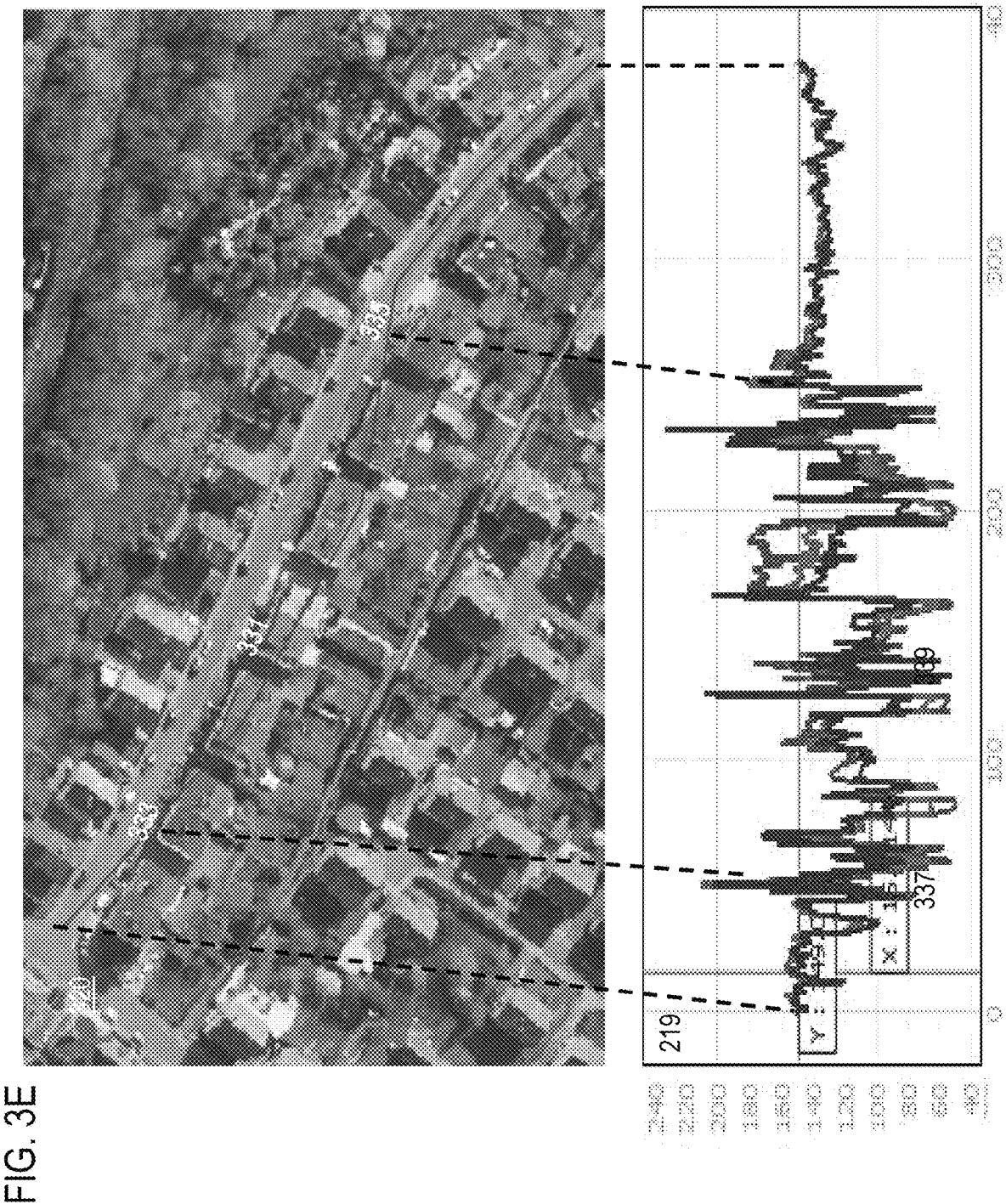

FIGS. 3D-3E are diagrams of spectral pixel values of two vector geometry examples, according to various embodiments. FIGS. 3D-3E share a recent or latest raster image 320 which covers a bigger area than the raster image 301 in FIG. 3B yet with two vector geometry examples 321 and 331 respectively that were created (e.g., by some map creator application user or as input data set from a source supplier such as a direct crowd-source, OpenStreetMap, a public agency, a commercial source, etc.) and need to be validated/confirmed to ensure the data is correct and up to date. To human eyes, the vector geometry example 321 in FIG. 3D is more aligned with the road link in the raster image 320 than the vector geometry example 331 in FIG. 3E. To the system 100, the spectral profile diagram 217 in FIG. 3D also demonstrates as more aligned with the road link in the raster image 320 than the spectral profile diagram 219 in FIG. 3E.

In FIG. 3D, the spectral profile diagram 217 at the bottom with a list of spectral pixel values in R, G, B channels/bands correspond to the vector geometry example 321. To human eyes, the vector geometry example 321 in FIG. 3D is generally aligned with the road link in the raster image 320. To the system 100, as shown in the spectral profile diagram 217, the spectral values of a gray asphalt road surface of the road link 101 for each band are quite homogeneous (e.g., varying between 120 and 160 for each band), except drops 327, 329 (e.g., darker values corresponding to a powerline, etc.) at locations 323, 325 of the vector geometry example 321. In this case, the spectral profile diagram 217 shows a high degree of alignment, i.e., a high confidence indicator confirming that the vector geometry example 321 is validated as close to the road geometry in the real world (e.g., close to 100% match). In other words, the vector geometry example 321 a very close match with the actual road segment based on the relatively homogeneous spectral profile in the diagram 217 with minimum outliers/peaks yet overall very low noise.

In FIG. 3E, the spectral profile diagram 219 at the bottom with a list of spectral pixel values in R, G, B channels/bands correspond to the vector geometry example 331. To human eyes, the vector geometry example 331 in FIG. 3E deviates from the road link in the raster image 320 to cross houses and grass lands. To the system 100, as shown in the spectral profile diagram 219, the spectral values of a gray asphalt road surface of the road link 101 for each band fluctuate between 50 and 230 for the bands, especially between locations 333, 335 of the vector geometry example 331 (corresponding to a peak 337 and a drop 339 in the spectral profile diagram 219). In this case, the spectral profile diagram 219 shows a low degree of alignment, i.e., a low confidence indicator confirming that the vector geometry example 321 is validated as deviating from the road geometry in the real world. When a vector representation of a road link is not aligned with the spectral signature, the confidence indicator decreases.

In other words, the same road is represented with the slightly shifted vector geometry example 331. This vector geometry example 331 intersects with the buildings and grass lands along the road. Within the spectral profile in the diagram 219, there is much more noise and a large number of higher peaks and lower drops, i.e., clear indicators that the pixels "behind" the vector geometry example 331 are not homogeneous. As results, the right portion of the vector geometry example 331 has a high confirmation, whereas the shifted portion of the vector geometry example 331 shows a low confirmation.

For road geometry vector data showing a low confirmation, the system 100 can just remove the data and/or initiate further review/verification, e.g., by human, artificial intelligence, machine learning algorithms, etc. Alternatively or concurrently, the system 100 can use the confirmation results to perform statistical analysis and build a quality matrix for the respective road geometry vector data source.

Figure 3G:
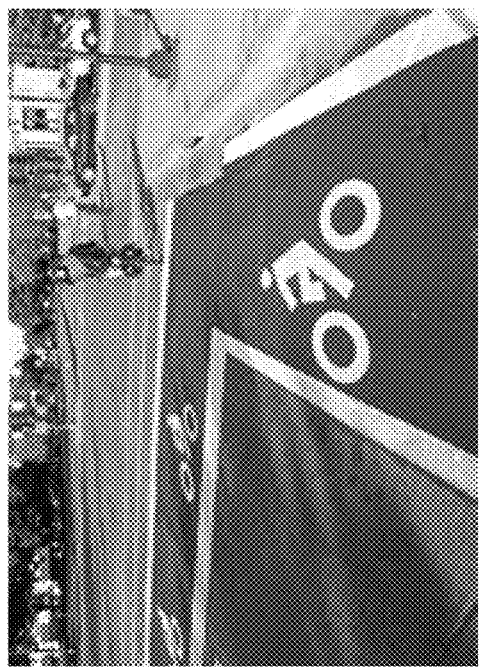
FIGS. 3F-3H are diagrams of example aerial images, according to various embodiments.
Figure 3F:
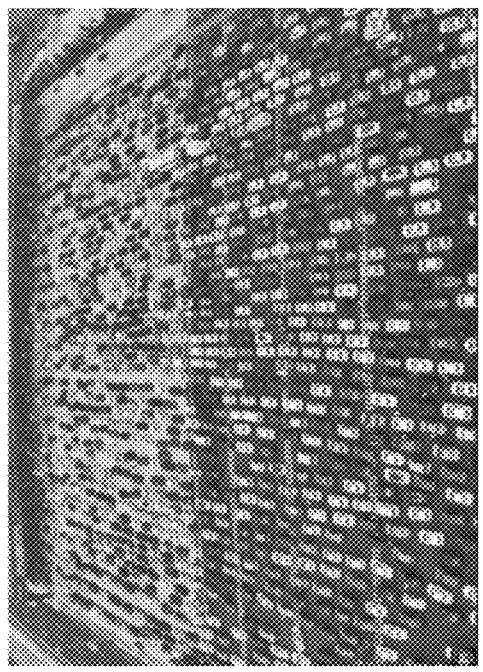

In another embodiment, the system 100 can use statistical information related to the color distribution of vehicles 105a-105n (also collectively referred to as vehicles 105) to ensure road segments occupied with vehicles are properly coded as road elements rather than being disregarded due to the high variations of colors. For instance, FIG. 3F shows an example aerial image of a road segment occupied by rows of vehicles that lead to an untypical RGB representation (e.g., of a road or vegetation). Such statistical information related to the vehicle color distribution can be observed from historic aerial images, drive files, etc. of the exact road, roads in the area (e.g., a tile, a zip code, a town, a city, a province, a country, etc.), etc.

In this case, the system 100 can process the aerial image in FIG. 3F to determine a color distribution of the vehicles depicted in the aerial image, and adjust the spectral pixel values extracting in the process 200 based on the color distribution of the vehicles, such as removing the noise caused by the vehicle color distribution (e.g., of vehicles of various colors) from the spectrum profile of the road in the aerial image in FIG. 3F. By way of example, the adjustment of the spectral pixel values can be triggered when a spectral pixel value variation of the spectral profile (e.g., peaks of various vehicle colors) is greater than a threshold variation (e.g., 150).

In yet another embodiment, the system 100 can use multiple aerial images to remove noise related to the passing vehicles or moving/temporary elements such as fallen trees/leaves, water, mud, snow, ice, oil spills, traffic cones, temporary road markings/signs, shadows of road furniture, etc. For instance, the system 100 can use multiple aerial images including image(s) with and without the moving/temporary elements to identify the color distribution of the moving/temporary elements, and then adjust the spectral pixel values as discussed thereby removing the noise caused by the moving/temporary elements. By way of example, aerial images taken at noon time have less shadows, such that the system 100 can use recent or latest aerial images taken during noon time to minimize noise caused by shadows on road segments. Similarly, the system 100 can use recent or latest aerial images taken during no or low vehicle traffic (e.g., early morning), to avoid noise caused by vehicles on road segments. For instance, the system 100 can access historical traffic information services to find such aerial images with timestamps corresponding to desired traffic volumes for performing the process 200.

In yet another embodiment, the system 100 can use the spectral pixel values contributed by vehicles to count vehicle numbers in aerial image(s) for traffic data, for cross checking with other sources of traffic data.

Figure 3H:

Beside roadways, the system 100 can apply the process 200 to automatedly confirm any pre-existing map feature geometry (e.g., other road link geometry such as bike lanes, waterways, etc.) with homogeneous spectral pixel values in aerial images. A bike lane is a road link dedicated for bicycles, while a waterway can be a road link for water-based transport. For instance, FIG. 3G is an aerial image showing bike lanes and FIG. 3H is an aerial image showing a river (i.e., an example waterway) for the system 100 to apply the process 200 to confirm respective pre-existing map feature geometry.

In another embodiment, the system 100 can apply the process 200 to confirm more complicated map elements with polygon representations, such as a roof with two boxes of colors and/or extra patterns via their edges.

Therefore, the system 100 can leverage latest technological advances in aerial imagery in higher frequency and accuracy and simply rely on pixel values in the aerial images to confirm the road geometries for mapping in an automated, scalable way without using machine learning models (e.g. supervised learning).

In one embodiment, the system 100 can determine vector data of the road link 101 by processing sensor data (including vehicle trajectory data) from the vehicles 105 (e.g., standard vehicles, autonomous vehicles, heavily assisted driving (HAD) vehicles, semi-autonomous vehicles, etc.). In one instance, the vehicles 105 include one or more vehicle sensors 107a-107n (also collectively referred to as vehicle sensors 107) (e.g., positioning sensors) and have connectivity to a mapping platform 109 via a communication network 111. In one embodiment, the sensor data includes probe data may be reported as probe points, which are individual data records collected at a point in time that records telemetry data for that point in time. A probe point can include attributes such as: (1) probe ID, (2) longitude, (3) latitude, (4) elevation, (5) heading, (6) speed, and (7) time. The list of attributes is provided by way of illustration and not limitation. For example, attributes such as tilt, steering angle, wiper activation, etc. can be included and reported for a probe point. In one embodiment, the vehicles 105 may include vehicle sensors 107 for reporting measuring and/or reporting attributes. The attributes can also be any attribute normally collected by an on-board diagnostic (OBD) system of the vehicle 105, and available through an interface to the OBD system (e.g., OBD II interface or other similar interface).

In one embodiment, the system 100 can also collect road vector data from one or more user equipment (UE) 113a-113n (also collectively referenced to herein as UEs 113) associated with the vehicles 105 (e.g., an embedded navigation system), a user or a passenger of a vehicle 105 (e.g., a mobile device, a smartphone, a client terminal, etc.), or a combination thereof In one instance, the UEs 113 may include one or more applications 115a-115n (also collectively referred to herein as applications 115) (e.g., a navigation or mapping application). In one embodiment, the system 100 may also collect the road vector data from one or more other sources such as government/municipality agencies, local or community agencies (e.g., police departments), and/or third-party official/semi-official sources (e.g., the services platform 117, one or more services 119a-119n, one or more content providers 121a-121m, etc.). In one instance, the probe data collected by the vehicle sensors 107, the UEs 113, one or more other sources, or a combination thereof may be stored in a geographic database 123.

Figure 4:
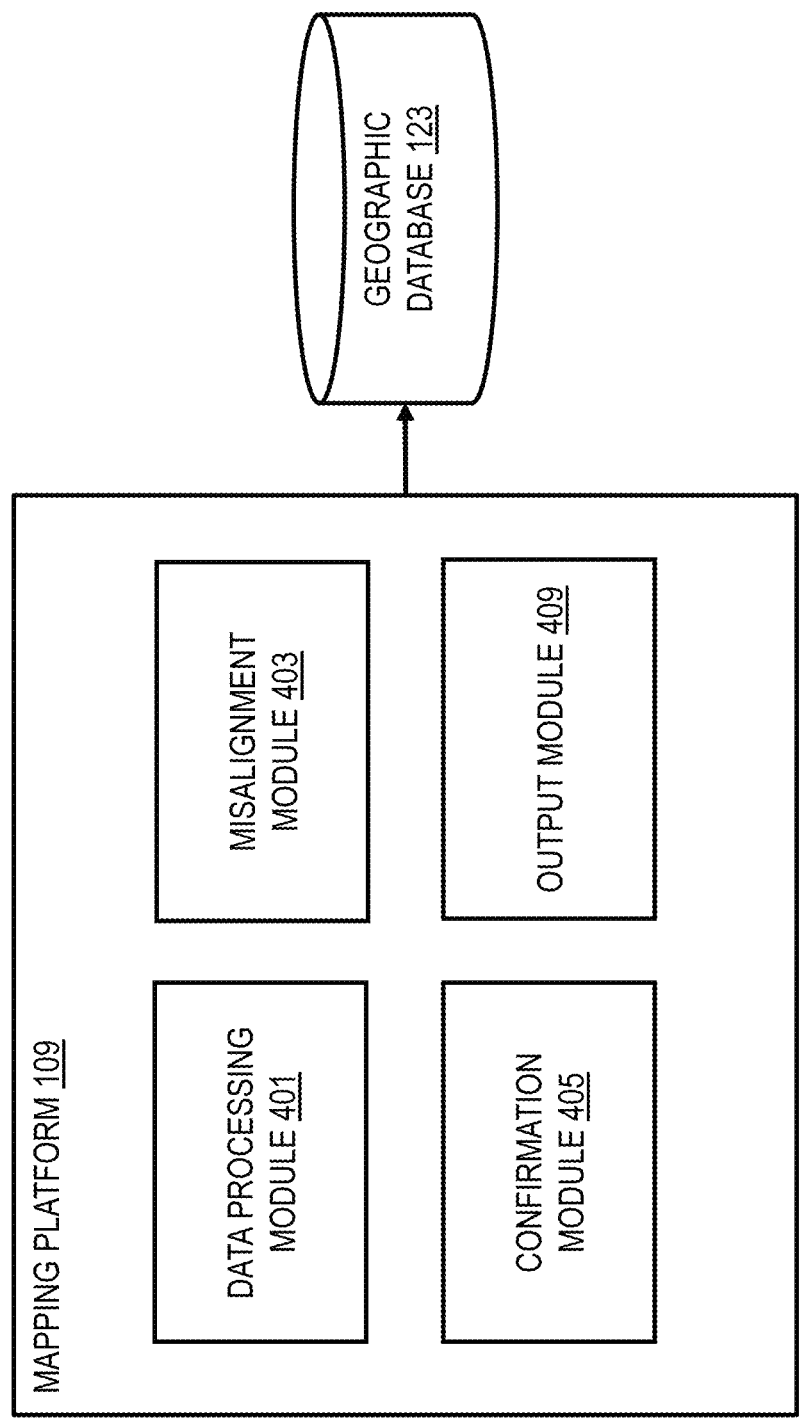
FIG. 4 is a diagram of the components of the mapping platform, according to one embodiment.

FIG. 4 is a diagram of the components of the mapping platform 109, according to one embodiment. By way of example, the mapping platform 109 includes one or more components for confirming road vector geometry based on aerial image(s), according to the various embodiments described herein. It is contemplated that the functions of these components may be combined or performed by other components of equivalent functionality. In one embodiment, the mapping platform 109 includes a data processing module 401, a misalignment module 403, a confirmation module 405, and an output module 407, and has connectivity to the geographic database 123. The above presented modules and components of the mapping platform 109 can be implemented in hardware, firmware, software, or a combination thereof. Though depicted as a separate entity in FIG. 1, it is contemplated that the mapping platform 109 may be implemented as a module of any other component of the system 100. In another embodiment, the mapping platform 109 and/or the modules 401-407 may be implemented as a cloud-based service, local service, native application, or combination thereof. The functions of the mapping platform 109, the modules 401-407, and/or edge devices (e.g., UEs 113) are discussed with respect to FIGS. 2-6.

Figure 5:
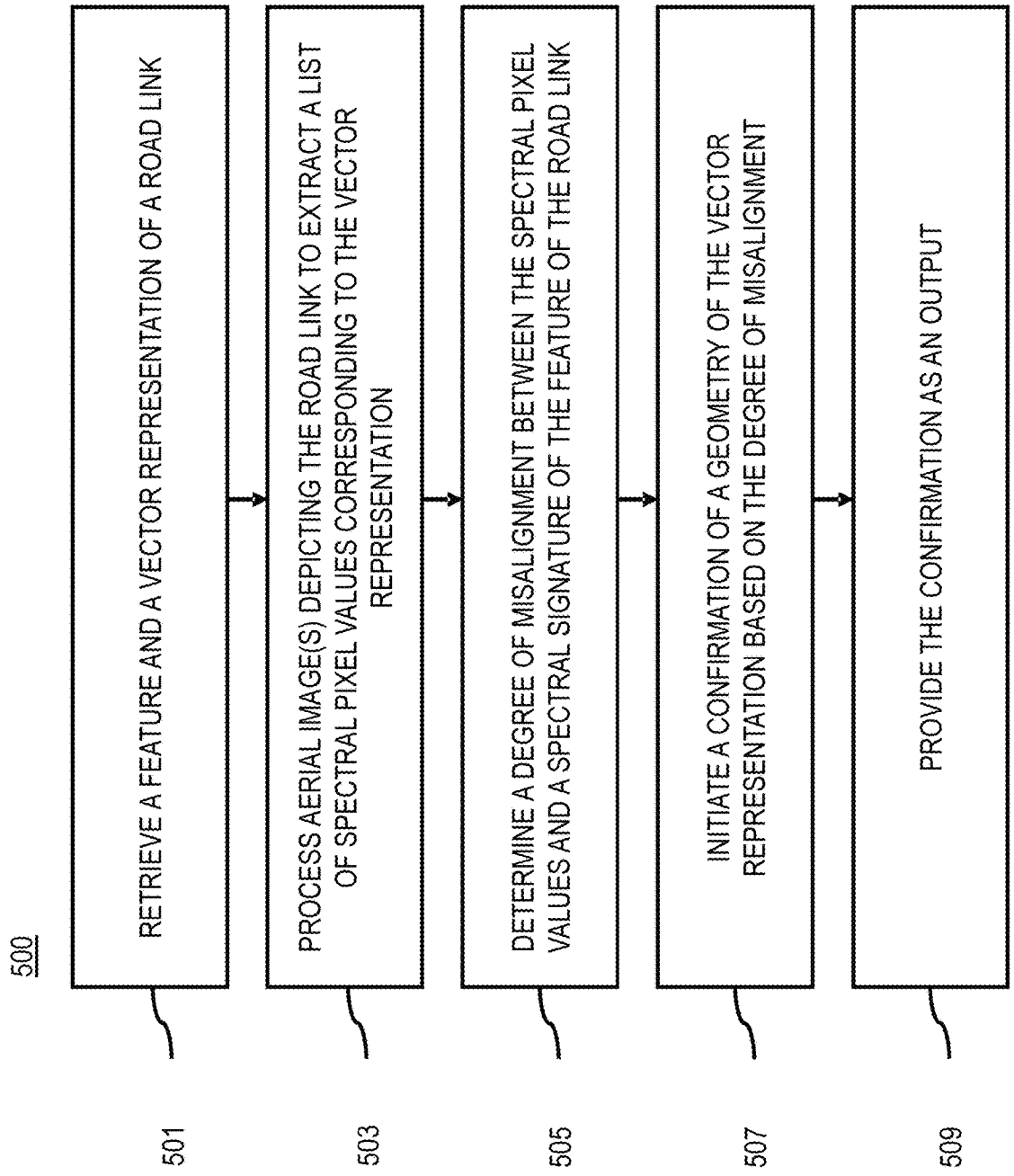
FIG. 5 is a flowchart of a process for confirming road vector geometry based on aerial image(s), according to one embodiment.
Figure 9:
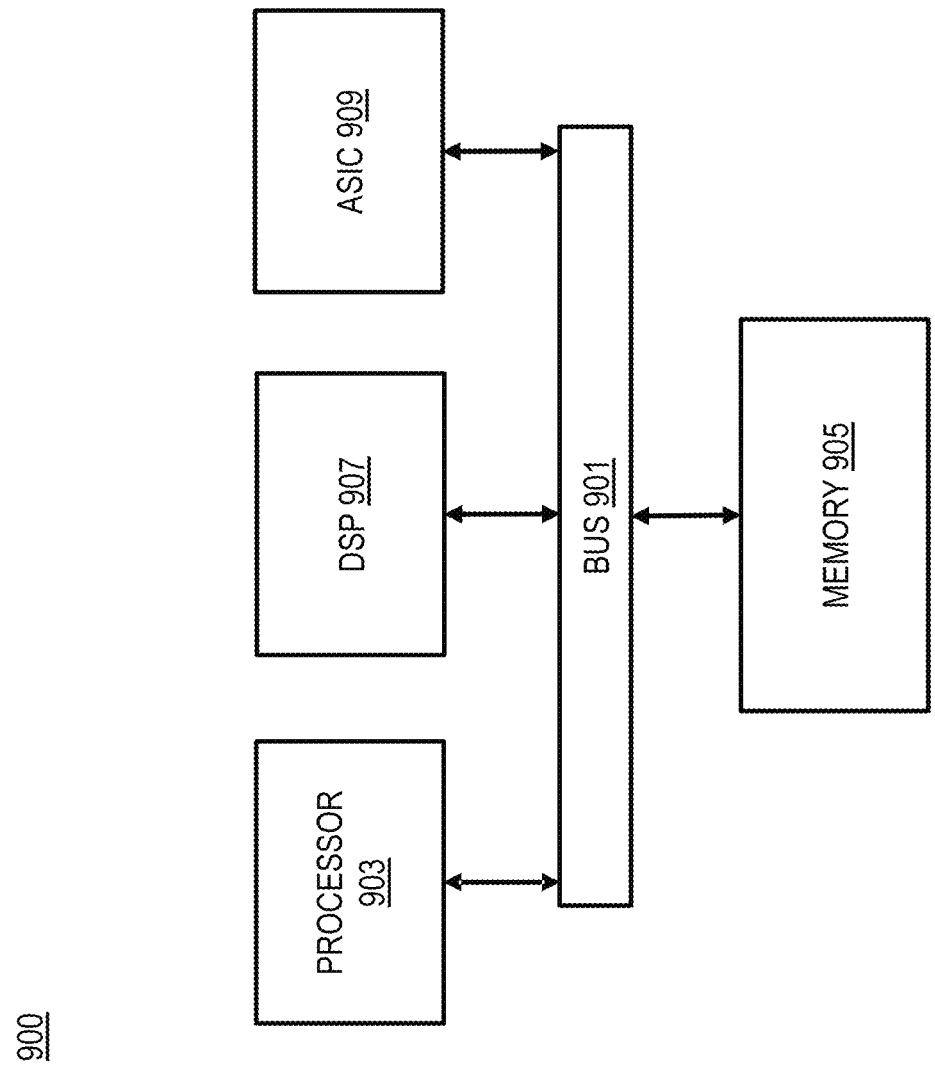
FIG. 9 is a diagram of a chip set that can be used to implement an embodiment.

FIG. 5 is a flowchart of a process for confirming road vector geometry based on aerial image(s), according to one embodiment. In various embodiments, the mapping platform 109, and/or any of the modules 401-407 may perform one or more portions of the process 500 and may be implemented in, for instance, a chip set including a processor and a memory as shown in FIG. 9. As such, the mapping platform 109, and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In one embodiment, for example, in step 501, the data processing module 401 can retrieve a feature and a vector representation (e.g., the vector geometry example 321 in FIG. 3D, the vector geometry example 331 in FIG. 3E) of a road link (e.g., associated with a roadway, a waterway, or a bike lane).

In one embodiment, in step 503, the data processing module 401 can process one or more aerial images (e.g., the raster image 211 in FIG. 2) depicting the road link (e.g., the road link 101) to extract a list of spectral pixel values (e.g., the spectral pixel values 103) corresponding to the vector representation of the road link. For instance, the data processing module 401 can extract a list of pixels in the one or more aerial images based on the vector representation of the road link and a line-drawing algorithm (e.g., Bresenham Algorithm), and the list of spectral pixel values are associated with the list of pixels.

In one embodiment, in step 505, the misalignment module 403 can determine a degree of misalignment (e.g., the degree of misalignment 215) between the spectral pixel values (e.g., the spectral profile in the diagram 217 in FIG. 3D, the spectral profile in the diagram 219 in FIG. 3E, etc.) and a spectral signature (e.g., asphalt, tarmac, concrete, or other road surface materials) of the feature of the road link (e.g., the spectral signature 213 in FIG. 2A, the spectral signatures in FIG. 3A). By way of example, the vector representation can be retrieved from digital map data of a geographic database (e.g., the geographic database 123).

In one embodiment, in step 507, the confirmation module 405 can initiate a confirmation of a geometry of the vector representation (e.g., the vector geometry example 321 in FIG. 3D) based on the degree of misalignment (e.g., of the corresponding spectral pixel data in R, G, B bands in the spectral profile in FIG. 3D). In another embodiment, the confirmation module 405 can compute a confidence indicator (e.g., almost 100% in FIG. 3D) based on the degree of misalignment, and the confirmation of the geometry of the vector representation can be based on the confidence indicator. For instance, the confidence indicator decreases as the degree of misalignment increases. As shown in FIG. 3B, the spectral feature signature of one uniform material (e.g., asphalt) typically maintains a higher correlation value among the RGB bands/channels, that leads to a higher confidence of alignment. The system 100 can set a predetermined threshold value based on experiments for the correlation and/or the confidence indicator thereby confirming the road vector geometry or raising a flag for review the road vector geometry.

In another embodiment, the data processing module 401 can process the one or more aerial images (e.g., similar to the roaster image in FIG. 3F) to determine a color distribution of a plurality vehicles depicted in the one or more aerial images, and adjust the extracting of the list of spectral pixel values is based on the color distribution (e.g., with a lot of white cars). For instance, the adjusting of the extracting of the list of spectral pixel values can be based on determining that a spectral pixel value variation of the fingerprint-like representation is greater than a threshold variation (e.g., 150).

In yet another embodiment, the data processing module 401 can process a plurality of the one or more aerial images to generate a reduced noise image, and the list of spectral pixel values can be extracted from the reduced noise image. For example, the reduced noise image can reduce image noise resulting from vehicle(s), road furniture, or a combination thereof on the road link. For instance, the data processing module 401 can adjust (e.g., noise-reduce) a road vector geometry to avoid/remove a power line over some portion(s) of the road link (e.g., with a corresponding length in meters), then extract the spectral pixel values from an aerial image.

Alternatively, the data processing module 401 can tolerate certain variations in the spectral profile for portion(s) of the road link corresponding to lengths of colored objects commonly found on the road (e.g. vehicles, road markings, etc.). In this case, the data processing module 401 can set a minimum length of a continuous spectral pixel value signature profile as a condition to determine whether the extracted information is useful to confirm a road vector geometry. Referring back to FIG. 3F, when the road link is occupied by too many vehicles and road markings to reveal sufficient road surface, the data processing module 401 cannot find a minimum length of a continuous spectral pixel value signature profile for the road link such that the aerial image in FIG. 3F is not suitable for the process 200.

In yet another embodiment, the data processing module 401 can process the one or more aerial images to determine spectral pixel variation data corresponding to one or more objects (e.g., fallen trees/leaves, water, mud, snow, ice, oil spills, traffic cones, temporary road markings/signs, shadows of road furniture, etc.) on the road link, and exclude one or more object spectral pixel values corresponding to the one or more objects from the list spectral pixel values before determining the degree of misalignment. In addition, the data processing module 401 can code an object type of the one or more objects based on the spectral pixel variation data, and the one or more object spectral pixel values can be excluded from the list of spectral pixel values based on the object type.

In yet another embodiment, the data processing module 401 can select the one or more aerial images based on traffic information associated with the road link. For instance, the data processing module 401 can select aerial images taken at noon time have less shadows, and/or during no or low vehicle traffic (e.g., early morning), to avoid noise caused by vehicles on road segments, etc.

Figure 6A:
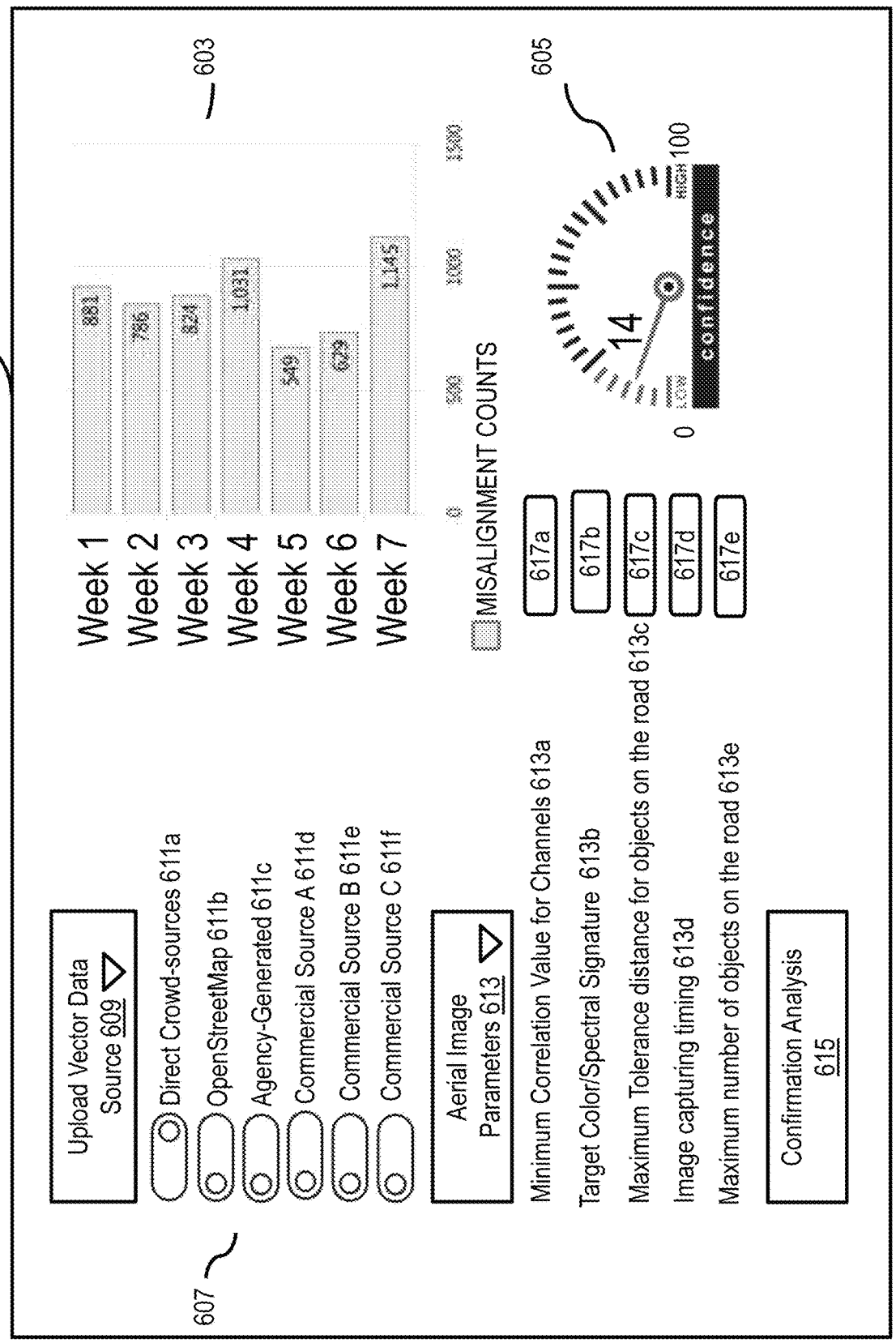
FIGS. 6A-6B are diagrams of example user interfaces of monitoring and/or applying road vector data, according to various embodiments.
Figure 6B:
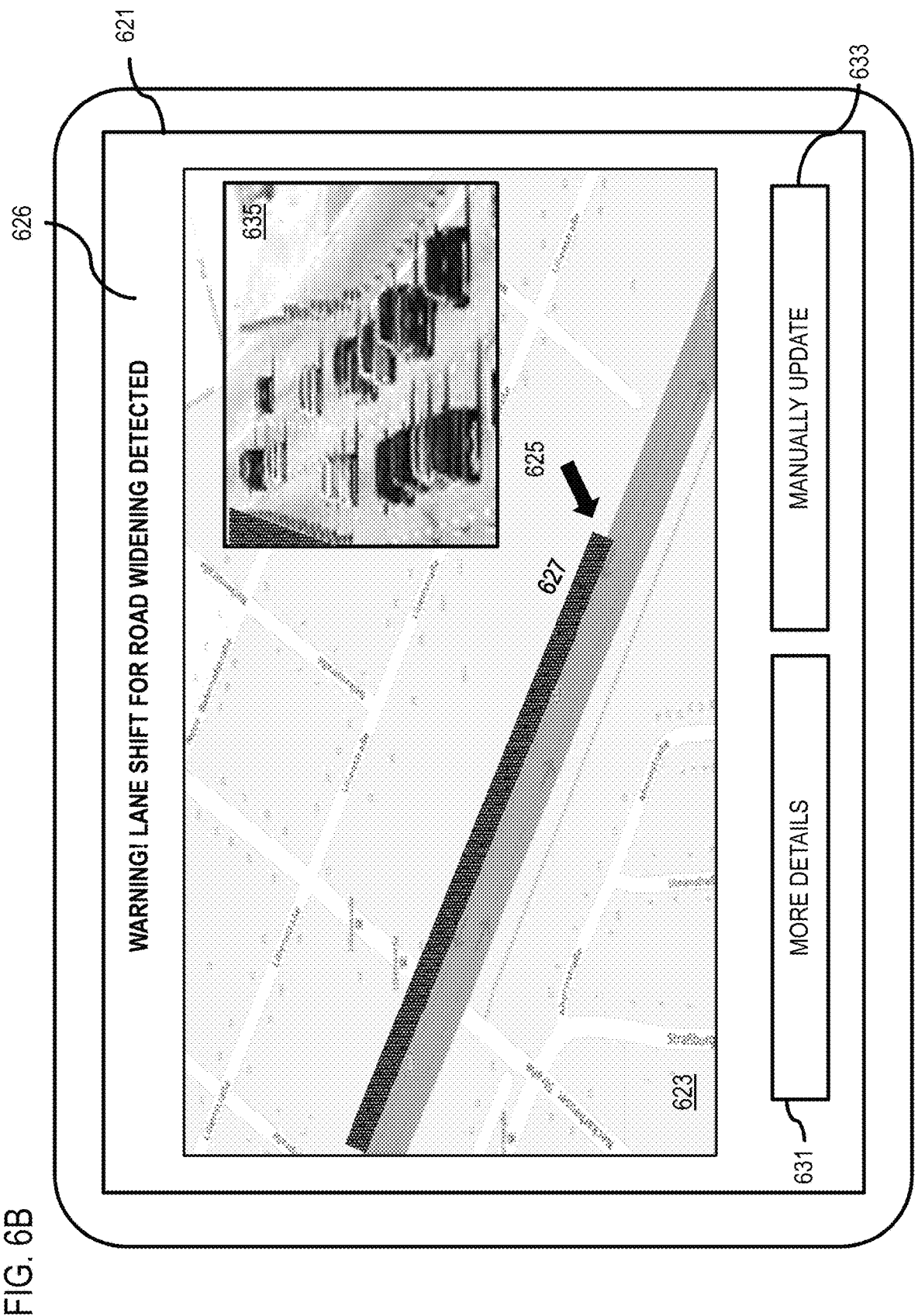

In short, the system 100 can set one or more parameters for selecting the aerial images such as a minimum correlation value for channels (e.g., "65%"), a target color/spectral signature (for calculating a deviation from a target feature, such as "asphalt"), a maximum tolerance distance for objects on the road (e.g., "4.5 meters" for a car), an image capturing timing (e.g., "noon time" to avoid shadows), a maximum tolerance number of objects on the road (e.g., "60" vehicles for a 50-meter highway segment), etc. In one embodiment, in step 509, the output module 407 can providing the confirmation as an output. FIGS. 6A-6B are diagrams of example user interfaces of monitoring and/or flagging road vector data, according to various embodiments. FIG. 6A is a diagram of a user interface associated with monitoring road vector data, according to example embodiment(s). In this example, the UI 601 may be generated for the UE 115 that depicts a bar chart 603 and a data source quality scale 605 as results of a confirmation analysis based on the above-discussed embodiments. For instance, the bar chart 603 shows weekly misalignment counts per an area of interest (e.g., city, town, zone, community, district, zip code, map tile, partition, etc.) of one road vector data source, while the data source quality scale 605 shows a probability (e.g., an average) that the misalignment count exceeds a threshold value.

The UI 601 further shows a confirmation analysis setting panel 607 that includes an upload vector data source menu 609, a plurality of data source switches 611, an aerial image parameter menu 613, and an input 615 of "Confirmation Analysis." By way of example, the data source switches 611 include direct crowd-sources 611a, OpenStreetMap 611b, agency-generated 611c, commercial source A 611d, commercial source B 611e, commercial source C 611f, etc. The aerial image parameters can include a minimum correlation value for channels 613a (e.g., with a value 617a of "65%"), a target color/spectral signature 613b (for calculating a deviation from a target feature, such as an attribute 617a of "asphalt"), a maximum tolerance distance for objects on the road 613c (e.g., with a value 617c of "4.5 meters" for a car), an image capturing timing 613d (e.g., with a retribute 617d of "noon time" to avoid shadows), a maximum tolerance number of objects on the road 613e (e.g., with a value 617e of "60" vehicles for a 50-meter highway segment), etc. Optionally, the UI 601 can display a color/spectral signature picking tool (not shown).

By way of example, the direct crowd-sources 611a is switched on and the above-mentioned example aerial image parameters are selected by a user (e.g., a map service provider, a city planner, a pedestrian, a driver, a passenger, etc. with different levels of data access based on credentials), and the user further selects the input 615 of "Confirmation Analysis". The user can be a human. Alternatively, the selection of the mentioned options can be performed by artificial intelligence via an application programming interface (API) without involving users or UIs, for automated submission of road links for review based on updated imagery. As a result, the system 100 analyzes the uploaded vector data based on one or more aerial images matching the example aerial image parameters to confirm some road links as validated and to flag some other road links for review as shown in FIG. 6B. In addition, the system 100 can use the confirmation analysis results to generate the weekly misalignment counts, calculate the confidence score as 14 (out of a full score of 100), and displays accordingly. Such confirmation analysis can help the map service provider, the city planner and/or induvial users, to understand the vector data source quality and adapt their usage of such vector data source accordingly.

The user interface 621 in FIG. 6B (e.g., a navigation application 115) is generated for a UE 113 (e.g., a mobile device, an embedded navigation system, a client terminal, etc.). The user interface 621 in FIG. 6B shows a map 623, an arrow 625 pointing towards a road link flagged for review (e.g., a lane shift caused by road widening detected on a road segment 627 in the map 623 based on the color difference between old and new road pavements reflected in the spectral profiles of the different road segments as discussed, and an alert 629: "Warning! Lane shift for road widening detected." The user interface 621 also shows a "More Details" button 631 and a "Manually Update" button 633. For examples, a user can interact with the user interfaces via one or more physical interactions (e.g., a touch, a tap, a gesture, typing, etc.), one or more voice commands (e.g., "review the flagged road link for geometry" "update the flagged road link with a new attribute," etc.), or a combination thereof.

When the user selects the "More Details" button 631, the user interface 621 shows a live traffic image 635. The user can then proceed with manually updating the road geometry change and/or the lane shift incident into the map database by selecting the "Manually Update" button 633. Alternatively, the system 100 can prompt the user to confirm the road geometry change and/or the lane shift incident determined by the system 100 to update the map database accordingly without further user intervention. This is particularly true in the case of a user that is a passenger in an autonomous vehicle. It is contemplated that the system 100 can determine or detect one or more actions by a user (e.g., an eye gaze) and automatically confirm the road geometry change and/or the road incident and update the map database accordingly.

Returning to FIG. 1, in one embodiment, the mapping platform 109 performs the process for confirming road vector geometry based on aerial image(s) as discussed with respect to the various embodiments described herein. For example, the mapping platform 109 can generate vehicle path related features (e.g., road geometry change(s), road incident(s), etc.) for map data validation and/or updates.

In one embodiment, the mapping platform 109 has connectivity over the communications network 111 to the services platform 117 (e.g., an OEM platform) that provides the services 119 (e.g., probe and/or sensor data collection services). By way of example, the services 119 may also be other third-party services and include mapping services, navigation services, road incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. whether a road link is closed or not) of the mapping platform 109 to provide services such as navigation, mapping, other location-based services, etc.

In one embodiment, the mapping platform 109 may be a platform with multiple interconnected components. The mapping platform 109 may include multiple servers, intelligent networking devices, computing devices, components, and corresponding software for providing parametric representations of lane lines. In addition, it is noted that the mapping platform 109 may be a separate entity of the system 100, a part of the services platform 117, a part of the one or more services 119, or included within a vehicle 105 (e.g., an embedded navigation system).

In one embodiment, content providers 121 may provide content or data (e.g., including road vector data, road closure reports, probe data, expected vehicle volume data, etc.) to the mapping platform 109, the UEs 113, the applications 115, the services platform 117, the services 119, the geographic database 123, and the vehicles 105. The content provided may be any type of content, such as map content, textual content, audio content, video content, image content, etc. In one embodiment, the content providers 121 may provide content regarding the expected frequency of vehicles 105 on the digital map or link as well as content that may aid in localizing a vehicle path or trajectory on a digital map or link (e.g., to assist with determining actual vehicle volumes on a road network). In one embodiment, the content providers 121 may also store content associated with the mapping platform 109, the services platform 117, the services 119, the geographic database 123, and/or the vehicles 105. In another embodiment, the content providers 121 may manage access to a central repository of data, and offer a consistent, standard interface to data, and/or the geographic database 123.

By way of example, the UEs 113 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 113 can support any type of interface to the user (such as "wearable" circuitry, etc.). In one embodiment, a UE 113 may be associated with a vehicle 105 (e.g., a mobile device) or be a component part of the vehicle 105 (e.g., an embedded navigation system). In one embodiment, the UEs 113 may include the mapping platform 109 to confirm road vector geometry based on aerial image(s).

In one embodiment, as mentioned above, the vehicles 105, for instance, are part of a system for collecting probe data for detecting road vector data, actual and expected vehicle volumes on a road network and/or measuring traffic conditions in a road network (e.g., free flow traffic versus a road closure). In one embodiment, each vehicle 105 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

The probe points can be reported from the vehicles 105 in real-time, in batches, continuously, or at any other frequency requested by the system 100 over, for instance, the communication network 111 for processing by the mapping platform 109. The probe points also can be map matched to specific road links stored in the geographic database 123. In one embodiment, the system 100 (e.g., via the mapping platform 109) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 105 are configured with various sensors (e.g., vehicle sensors 107) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the geographic database 123) includes location probes collected by one or more vehicle sensors 107. By way of example, the vehicle sensors 107 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 105, switch sensors for determining whether one or more vehicle switches are engaged, and the like. Though depicted as automobiles, it is contemplated the vehicles 105 can be any type of vehicle manned or unmanned (e.g., cars, trucks, buses, vans, motorcycles, scooters, drones, etc.) that travels through road links of a road network.

Other examples of sensors 107 of a vehicle 105 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 105 along a path of travel, moisture sensors, pressure sensors, etc. In a further example embodiment, vehicle sensors 107 about the perimeter of a vehicle 105 may detect the relative distance of the vehicle 105 from a physical divider, a lane line of a link or roadway, the presence of other vehicles, pedestrians, traffic lights, potholes and any other objects, or a combination thereof. In one scenario, the vehicle sensors 107 may detect weather data, traffic information, or a combination thereof. In one embodiment, a vehicle 105 may include GPS or other satellite-based receivers to obtain geographic coordinates from satellites 125 for determining current location and time. Further, the location can be determined by visual odometry, triangulation systems such as A-GPS, Cell of Origin, or other location extrapolation technologies.

In one embodiment, the UEs 113 may also be configured with various sensors (not shown for illustrative convenience) for acquiring and/or generating probe data and/or sensor data associated with a vehicle 105, a driver, a passenger, other vehicles, conditions regarding the driving environment or roadway, etc. For example, such sensors may be used as GPS receivers for interacting with the one or more satellites 125 to determine and track the current speed, position, and location of a vehicle 105 travelling along a link or road link. In addition, the sensors may gather tilt data (e.g., a degree of incline or decline of the vehicle during travel), motion data, light data, sound data, image data, weather data, temporal data and other data associated with the vehicles 105 and/or UEs 113. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 111 as probe data (e.g., GPS probe data) according to any known wireless communication protocols. For example, each UE 113, application 115, user, and/or vehicle 105 may be assigned a unique probe identifier (probe ID) for use in reporting or transmitting the probe data collected by the vehicles 105 and/or UEs 113. In one embodiment, each vehicle 105 and/or UE 113 is configured to report probe data as probe points, which are individual data records collected at a point in time that records telemetry data.

In one embodiment, the mapping platform 109 retrieves aggregated probe points gathered and/or generated by the vehicle sensors 107 and/or the UEs 113 resulting from the travel of the UEs 113 and/or vehicles 105 on a road link of a road network. In one instance, the geographic database 123 stores a plurality of probe points and/or trajectories generated by different vehicle sensors 107, UEs 113, applications 115, vehicles 105, etc. over a period while traveling in a large, monitored area (e.g., a stretch of roadway where a closure incident is reported). A time sequence of probe points specifies a trajectory—i.e., a path traversed by a UE 113, application 115, vehicle 105, etc. over the period. In one instance, as the time between data points increases, so does the distance and the possible routes/paths between those two points.

In one embodiment, the communication network 111 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 105, vehicle sensors 107, mapping platform 109, UEs 113, applications 115, services platform 117, services 119, content providers 121, and/or satellites 125 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
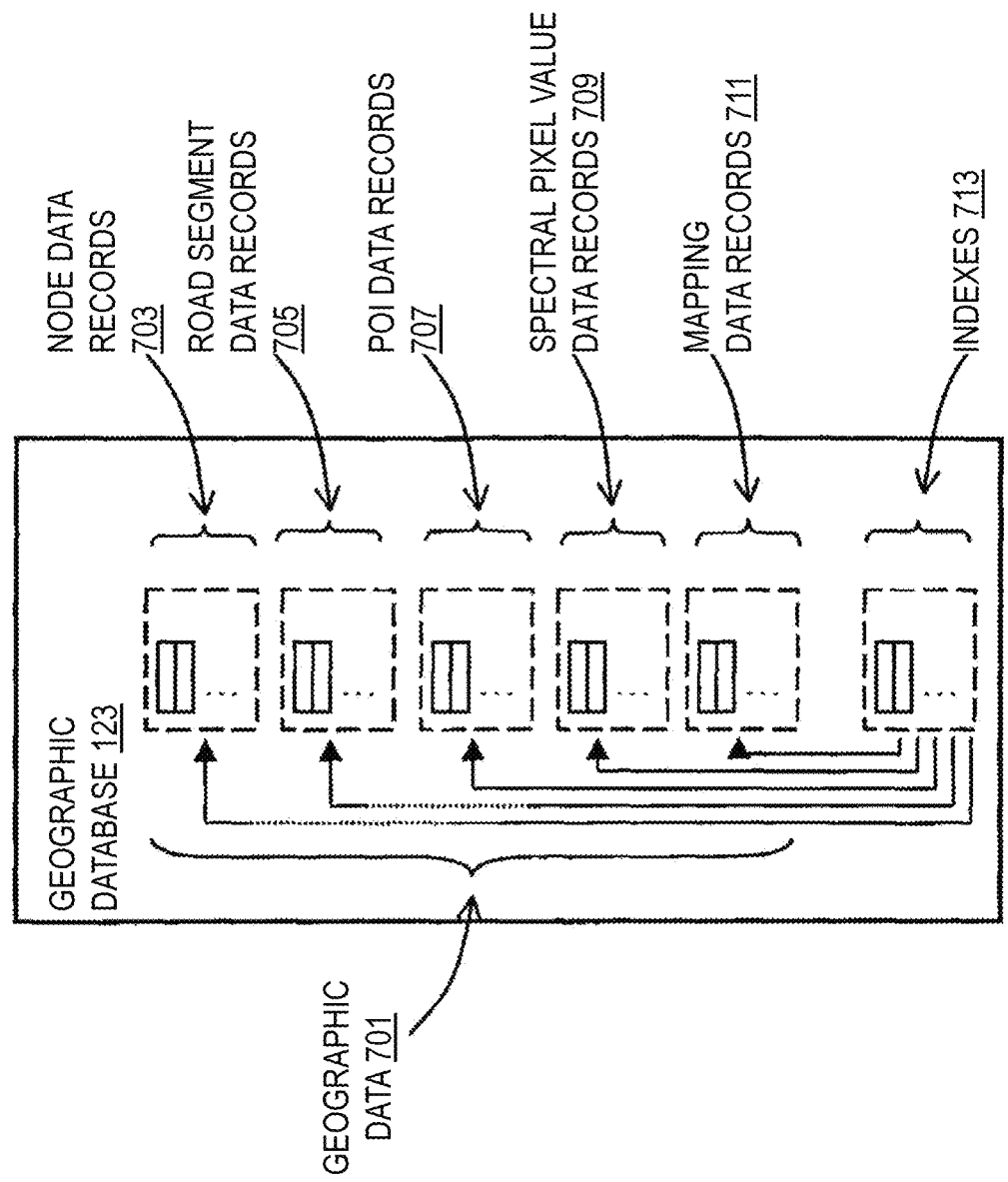
FIG. 7 is a diagram of a geographic database, according to one embodiment.

FIG. 7 is a diagram of a geographic database (such as the database 123), according to example embodiment(s). In one embodiment, the geographic database 123 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end. For instance, such link can be a straight line, a spline, etc.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road link or link data records 705, POI data records 707, spectral pixel value data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road link data records 705 are links or segments representing roads, streets, or paths, as can be used in the calculated route or recorded route information for determination of one or more personalized routes. The node data records 703 are end points (such as intersections) corresponding to the respective links or segments of the road link data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 123 can also include the spectral pixel value data records 709 for storing spectral pixel value data records, spectral profile data, road geometry data, misalignment data, confirmation data, map element color distribution data, training data, prediction models, annotated observations, computed featured distributions, sampling probabilities, and/or any other data generated or used by the system 100 according to the various embodiments described herein. By way of example, the spectral pixel value data records 709 can be associated with one or more of the node records 703, road link records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to vehicles 105 and other end user devices with near real-time speed without overloading the available resources of the vehicles 105 and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 117 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 105 and/or UEs 113) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or a UE 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for confirming road vector geometry based on aerial image(s) may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
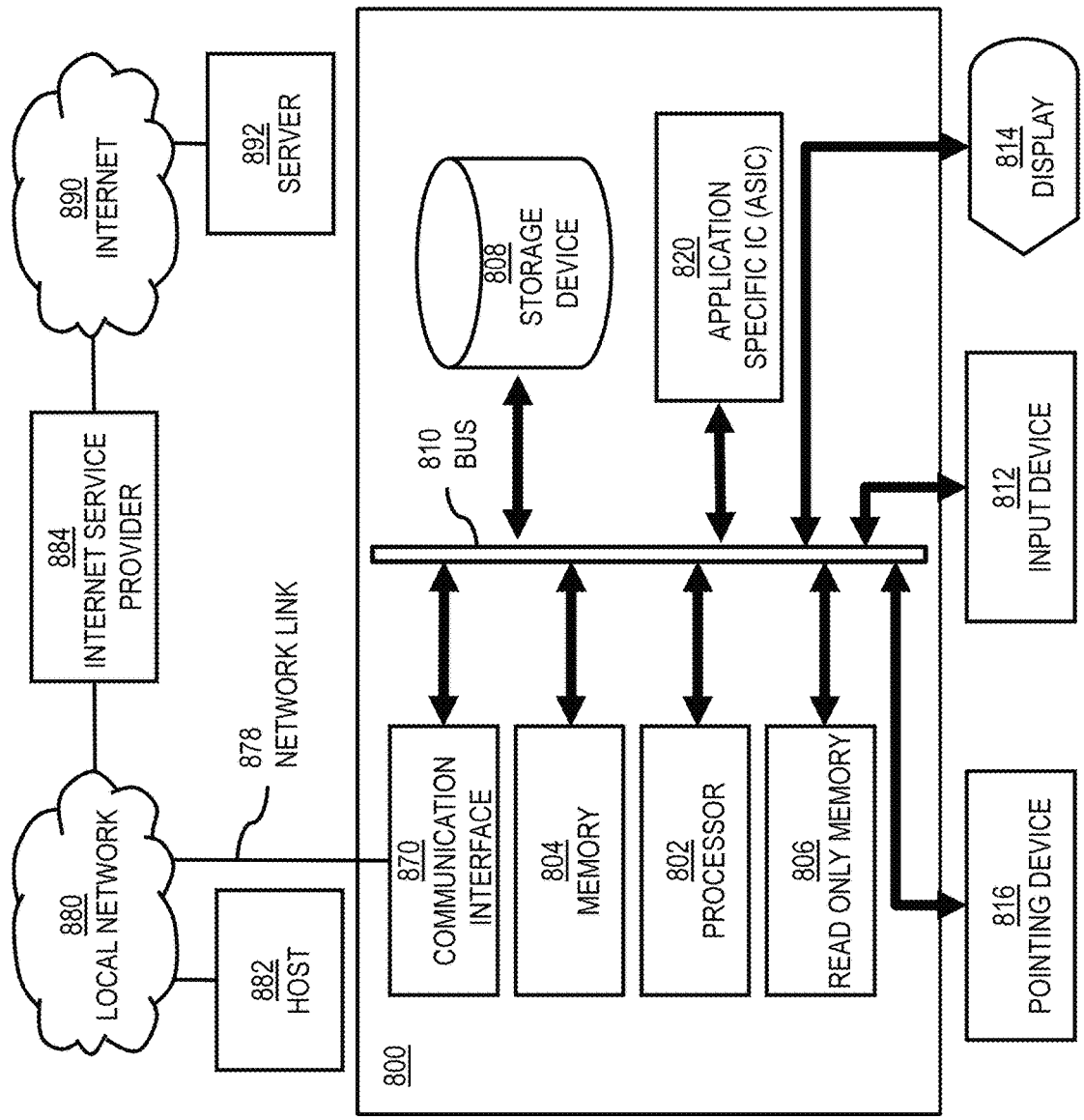
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to confirm road vector geometry based on aerial image(s) as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to confirming road vector geometry based on aerial image(s). The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for confirming road vector geometry based on aerial image(s). Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for confirming road vector geometry based on aerial image(s), is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for confirming road vector geometry based on aerial image(s).

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to confirm road vector geometry based on aerial image(s) as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to confirm road vector geometry based on aerial image(s). The memory 905 also stores the data associated with or generated by the execution of the inventive steps.

Figure 10:
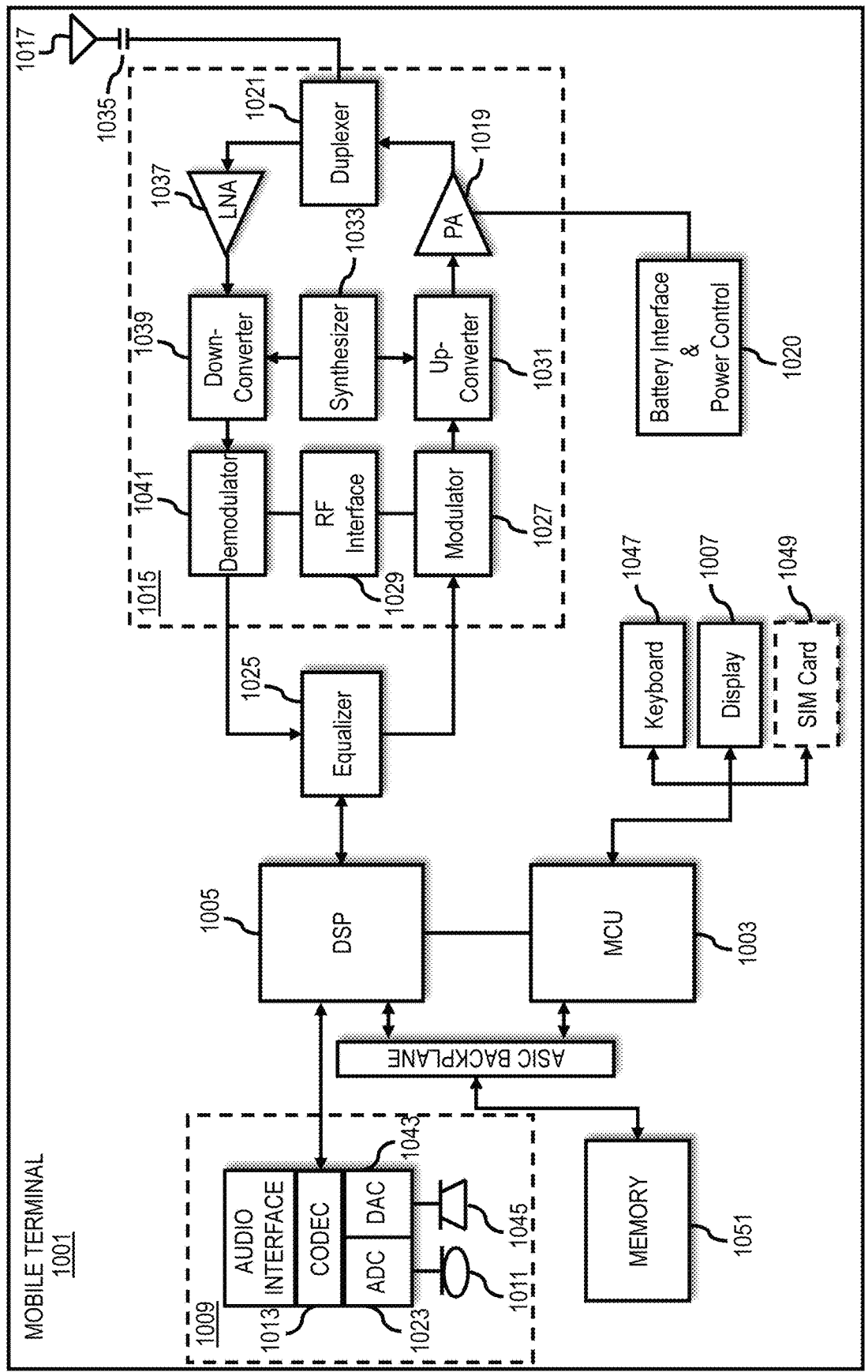
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset or vehicle or part thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to confirm road vector geometry based on aerial image(s). The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   retrieving a feature and a vector representation of a road link;
   processing one or more aerial images depicting the road link to extract a list of spectral pixel values corresponding to the vector representation;
   determining a degree of misalignment between the spectral pixel values and a spectral signature of the feature of the road link;
   initiating a confirmation of a geometry of the vector representation based on the degree of misalignment; and
   providing the confirmation as an output.

2. The method of claim 1, further comprising:
   computing a confidence indicator based on the degree of misalignment,
   wherein the confirmation of the geometry of the vector representation is based on the confidence indicator.

3. The method of claim 1, further comprising:
   extracting a list of pixels in the one or more aerial images based on the vector representation of the road link, wherein the list of spectral pixel values are associated with the list of pixels.

4. The method of claim 3, wherein the list of pixels is extracted from the one or more aerial images based on a line-drawing algorithm.

5. The method of claim 1, further comprising:
   processing the one or more aerial images to determine a color distribution of a plurality of vehicles depicted in the one or more aerial images; and
   adjusting the extracting of the list of spectral pixel values based on the color distribution.

6. The method of claim 5, wherein the adjusting of the extracting of the list of spectral pixel values is based on determining that a spectral pixel value variation of the spectral pixel values is greater than a threshold variation.

7. The method of claim 1, further comprising:
   processing a plurality of the one or more aerial images to generate a reduced noise image,
   wherein the list of spectral pixel values is extracted from the reduced noise image.

8. The method of claim 7, wherein the reduced noise image reduces image noise resulting from a vehicle, a road furniture, or a combination thereof on the road link.

9. The method of claim 1, further comprising:
   processing the one or more aerial images to determine spectral pixel variation data corresponding to one or more objects on the road link; and
   excluding one or more object spectral pixel values corresponding to the one or more objects from the list of spectral pixel values before determining the degree of misalignment.

10. The method of claim 9, further comprising:
    coding an object type of the one or more objects based on the spectral pixel variation data,
    wherein the one or more object spectral pixel values are excluded from the list of spectral pixel values based on the object type.

11. The method of claim 1, further comprising:
    selecting the one or more aerial images based on traffic information associated with the road link.

12. The method of claim 1, wherein the road link is associated with a roadway, a waterway, or a bike lane.

13. An apparatus comprising:
    at least one processor; and
    at least one memory including computer program code for one or more programs,
    the at least one memory and the computer program code configured to, with the at least one processor, cause the apparatus to perform at least the following,
    retrieve a feature and a vector representation of a road link;
    process one or more aerial images depicting the road link to extract a list of spectral pixel values corresponding to the vector representation;
    determine a degree of misalignment between the spectral pixel values and a spectral signature of the feature of the road link;
    initiate a confirmation of a geometry of the vector representation based on the degree of misalignment; and
    provide the confirmation as an output.

14. The apparatus of claim 13, wherein the apparatus is further caused to:
    compute a confidence indicator based on the degree of misalignment,
    wherein the confirmation of the geometry of the vector representation is based on the confidence indicator.

15. The apparatus of claim 13, wherein the apparatus is further caused to:
    extract a list of pixels in the one or more aerial images based on the vector representation of the road link, wherein the list of spectral pixel values are associated with the list of pixels.

16. The apparatus of claim 13, wherein the list of pixels is extracted from the one or more aerial images based on a line-drawing algorithm.

17. The apparatus of claim 13, wherein the apparatus is further caused to:
- process the one or more aerial images to determine a color distribution of a plurality of vehicles depicted in the one or more aerial images; and
- adjust the extracting of the list of spectral pixel values based on the color distribution.

18. A non-transitory computer-readable storage medium carrying one or more sequences of one or more instructions which, when executed by one or more processors, cause an apparatus to perform:
- retrieving a feature and a vector representation of a road link;
- processing one or more aerial images depicting the road link to extract a list of spectral pixel values corresponding to the vector representation;
- determining a degree of misalignment between the spectral pixel values and a spectral signature of the feature of the road link;
- initiating a confirmation of a geometry of the vector representation based on the degree of misalignment; and
- providing the confirmation as an output.

19. The non-transitory computer-readable storage medium of claim 18, wherein the apparatus is caused to further perform:
- computing a confidence indicator based on the degree of misalignment,
- wherein the confirmation of the geometry of the vector representation is based on the confidence indicator.

20. The non-transitory computer-readable storage medium of claim 18, wherein the apparatus is caused to further perform:
- extracting a list of pixels in the one or more aerial images based on the vector representation of the road link, wherein the list of spectral pixel values are associated with the list of pixels.

* * * * *